(12) United States Patent
Tritchkov

(10) Patent No.: US 11,099,978 B2
(45) Date of Patent: Aug. 24, 2021

(54) MODELING SYSTEM FOR SOFTWARE-IMPLEMENTED TESTING USING DOMAIN SPECIFIC PROFILES TO TRANSLATE TESTS FOR A SUBSET OF PATHS INCLUDED IN A UML TEST MODEL

(71) Applicant: Siemens Aktiengesellshaft, Munich (DE)

(72) Inventor: Ivan Tritchkov, Erlangen (DE)

(73) Assignee: SIEMENS AKTIENGESELLSCHAFT

( * ) Notice: Subject to any disclaimer, the term of this patent is extended or adjusted under 35 U.S.C. 154(b) by 100 days.

(21) Appl. No.: 16/357,461

(22) Filed: Mar. 19, 2019

(65) Prior Publication Data

US 2019/0303279 A1 Oct. 3, 2019

(30) Foreign Application Priority Data

Mar. 27, 2018 (EP) .................................... 18164130

(51) Int. Cl.
*G06F 11/36* (2006.01)
*G06F 8/20* (2018.01)
*G06F 8/40* (2018.01)

(52) U.S. Cl.
CPC ...... *G06F 11/3692* (2013.01); *G06F 11/3608* (2013.01); *G06F 11/3664* (2013.01);
(Continued)

(58) Field of Classification Search
CPC ..... G06F 8/22; G06F 8/40; G06F 8/41; G06F 8/42; G06F 8/425; G06F 8/427;
(Continued)

(56) References Cited

U.S. PATENT DOCUMENTS 7,076,713 B1 * 7/2006 Hess ..................... G06F 11/263
714/741
10,073,763 B1 * 9/2018 Raman ................ G06F 11/3696
(Continued)

FOREIGN PATENT DOCUMENTS

KR 20140084698 A 7/2014
KR 20140084698 A 1/2016

OTHER PUBLICATIONS

KherraziRachid et al: "cucumberspec:atoolthatimprovesyour behaviour-driventesting",pp. 1-21, XP055501785, Retrieved from the Internet: URL:https://ucaat.etsi.org/2015/presentations/NSPYRE KHERRAZI. pdf, [retrieved-on Aug. 23, 2018], pp. 7,10,18,19, the whole document; 2015.

*Primary Examiner* — Joseph O Schell
(74) *Attorney, Agent, or Firm* — Schmeiser, Olsen & Watts LLP

(57) ABSTRACT

A modeling system is provided. The modeling system includes a test model creator, the test model creator being adapted for providing a test model based on an integrated modeling environment and considering a domain specific profile. The system further includes a test scenario generator, the test scenario generator being adapted for providing a plurality of test scenarios based on the test model, as well as a scenario translator, the scenario translator being adapted for translating the test scenarios, into domain-specific language.

12 Claims, 1 Drawing Sheet

(52) U.S. Cl.
CPC ...... *G06F 11/3684* (2013.01); *G06F 11/3688* (2013.01); *G06F 8/22* (2013.01); *G06F 8/40* (2013.01)

(58) Field of Classification Search
CPC ............. G06F 11/3608; G06F 11/3664; G06F 11/3684; G06F 11/3688
See application file for complete search history.

(56) References Cited

U.S. PATENT DOCUMENTS

| | | | |
|---|---|---|---|
| 2007/0174818 A1* | 7/2007 | Pasula | G06F 8/47 717/136 |
| 2007/0220342 A1* | 9/2007 | Vieira | G06F 11/3688 714/33 |
| 2010/0251209 A1* | 9/2010 | Murthy | G06F 11/263 717/104 |
| 2011/0145653 A1* | 6/2011 | Broadfoot | G06F 11/3604 714/38.1 |
| 2014/0331212 A1 | 11/2014 | Gaikwad et al. | |
| 2016/0170863 A1* | 6/2016 | Finnie | G06F 11/3672 717/131 |
| 2017/0185509 A1* | 6/2017 | Arkadyev | G06F 11/3696 |
| 2018/0260309 A1* | 9/2018 | Simoni | G06F 11/3608 |
| 2019/0213116 A1* | 7/2019 | Kulkarni | G06F 11/3664 |

\* cited by examiner

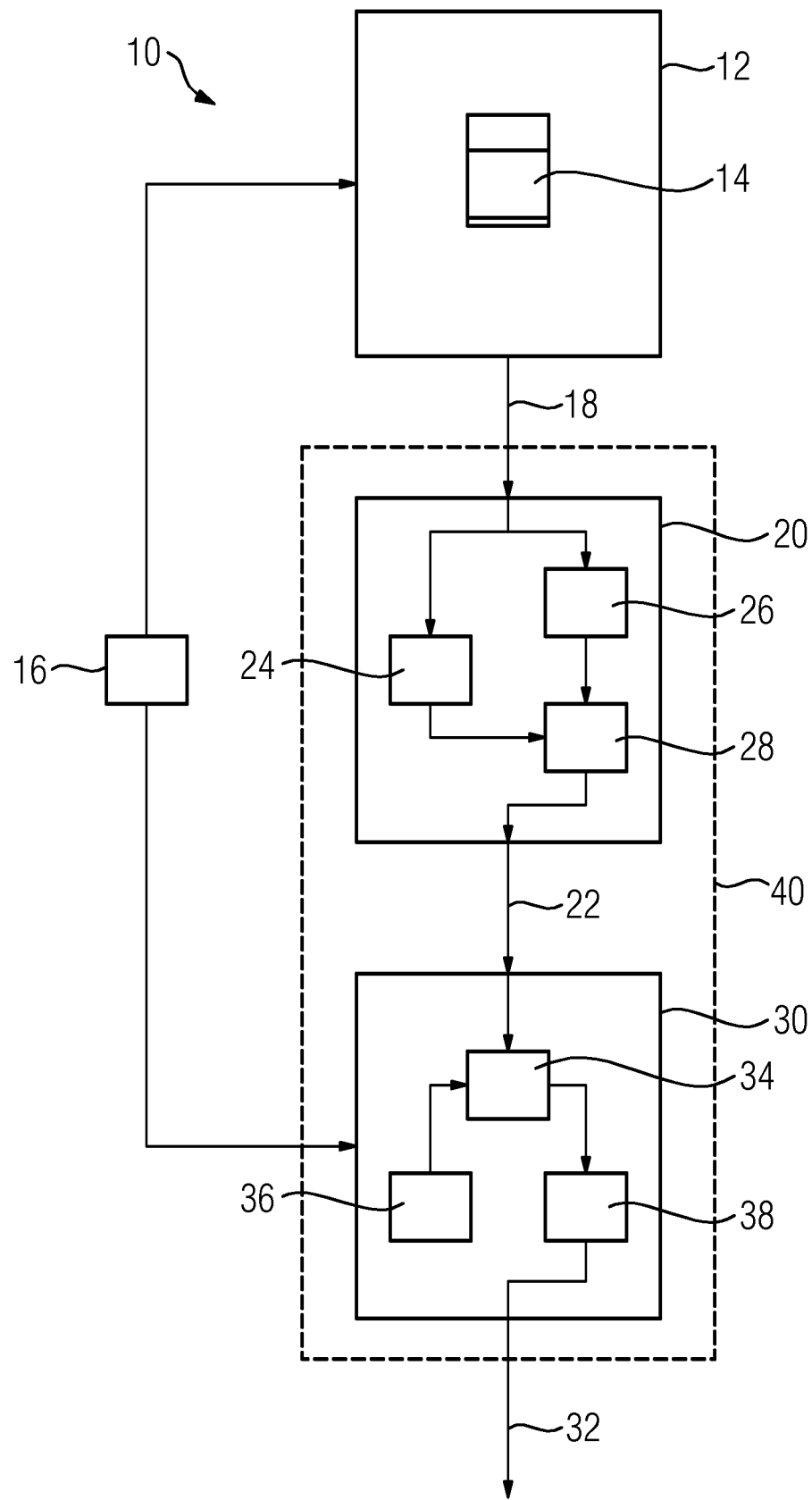

MODELING SYSTEM FOR SOFTWARE-IMPLEMENTED TESTING USING DOMAIN SPECIFIC PROFILES TO TRANSLATE TESTS FOR A SUBSET OF PATHS INCLUDED IN A UML TEST MODEL

CROSS-REFERENCE TO RELATED APPLICATIONS

This application claims priority to European application No. EP 18164130.9, having a filing date of Mar. 27, 2018, the entire contents of which are hereby incorporated by reference.

FIELD OF TECHNOLOGY

The following relates to a modeling system and related method for use in testing, in particular software testing.

BACKGROUND

In the development of systems, in particular system comprising software, tests have to be performed, e.g. for possible errors, performance and/or functionality. There are different approaches to develop corresponding tests. One approach is referred to as Model-Based Testing (MBT), in which a System Under Test (SUT) is modeled to represent desired characteristics of the system. MBT uses general representations of systems, e.g. using Unified Modeling Language (UML) or another generalised representation to develop the model and tests, as well as provide related information. Another approach, Behaviour-Driven Testing (BDT) uses domain-specific representations to describe test specifications of specific test scenarios. Such domain-specific representations are usually more human-readable than a general representation, but tend to focus on functionality and are less suitable to cover all areas of a system under test.

SUMMARY

An aspect relates to approaches allowing improved testing. Generally, there is suggested combining an MBT-based approach with elements of a BDT-based approach.

Accordingly, there is disclosed a modeling system. The modeling system comprises a test model creator. The test model creator is adapted for providing a test model based on an integrated modeling environment and considering a domain specific profile. The modeling system further comprises a test scenario generator, the test scenario generator being adapted for providing a plurality of test scenarios based on the test model. Moreover, the modeling system comprises a scenario translator, the scenario translator being adapted for translating the test scenarios, into domain-specific language. The system may be considered to implement a combination of an MBT-based approach and a BDT-based approach.

There may also be considered a method for providing test scenarios. The method comprises providing a test model based on an integrated modeling environment and considering a domain specific profile. The method also comprises providing a plurality of test scenarios based on the test model, as well as translating the test scenarios into domain-specific language. The method may be considered to implement a combination of an MBT-based approach and a BDT-based approach.

Translating the test scenarios may be based on the domain specific profile. Thus, the same profile may be basis for providing the test model and for translating the test scenarios. Consistent and efficient use of the profile hence is facilitated.

The test model may be represented in Unified Model Language (UML). In general, the test model may represent a system under test (SUT), which in particular may comprise, or be implemented as, software, and/or a physical system, e.g. a generator or power plant or automated system. It may be considered that the test model is represented by an extension of UML, or an extended generic language. This approach allows efficient combination of MBT and BDT aspects.

The modeling system further may comprise one or more testing units for performing tests of a system under test based on the translated test scenarios. Alternatively, or additionally, the method may comprise such performing. More alternatively, or additionally, the system may be adapted for, and/or the method may comprise, monitoring of the SUT, or a system developed and tested utilising the test scenarios. The system may be adapted for, and/or the method may comprise, monitoring the development of a SUT, and/or updating the test model, and correspondingly the test scenarios.

In some variants, the system may comprise a model analyser. The method may comprise, and/or the model analyser may be adapted for analysing and/or evaluating the test model.

The modeling system may comprise hardware and/or software and/or firmware. In particular, the modeling system may comprise processing circuitry and/or one or more interfaces. Processing circuitry may comprise integrated circuitry, and/or one or more processors and/or controllers, and/or may comprise and/or be connected or connectable to, memory for storing instruction and/or data related to the functions described herein. Generally, individual components and/or parts of the system, and/or method functionality, may be distributed over different devices and/or units. Corresponding interfaces may be provided, to facilitate communication between such devices and/or units. Each device or component, or subcomponent, may be associated to, and/or implemented as, corresponding module, in particular software module. The modeling system may be a computer system, and/or may comprise one or more computers.

The method may especially be carried out, completely or in part, by a computer system. To this end, the method may be formulated as a computer program product (non-transitory computer readable storage medium having instructions, which when executed by a processor, perform actions) with program code means. The above described system may comprise the computer system. Advantages or features of the method may apply to the method and vice versa.

In general, there may be considered a program product comprising instructions causing processing circuitry and/or a computer system to carry out and/or control a method as described herein. A storage medium storing a corresponding program product may be considered. The storage medium may comprise volatile and/or non-volatile memory, and/or may comprise magnetic or optical media, e.g. CD-ROM, or DVD, or flash memory or Random-Access Memory or hard disk or solid-state devices.

BRIEF DESCRIPTION

Some of the embodiments will be described in detail, with references to the following FIGURES, wherein like designations denote like members, wherein:

FIG. 1 shows an exemplary inventive modeling system.

DETAILED DESCRIPTION

FIG. 1 shows an exemplary modeling system 10. Modeling system 10 may comprise a test model creator 12, which may for example utilise a modeling environment 14, which may be an integrated modeling environment comprising a plurality of tools. The test model creator 12 may generally be adapted for creating a test model 18 of a system under test (SUT), in particular a software. The test model 18 may generally describe and/or represent a set of characteristics of the SUT, in particular desired characteristics and/or performance and/or functionality and/or behaviour. The test model 18 may represent one or more physical characteristics of the SUT. Generally, the test model 18 may be provided on input, e.g. user input and/or one or more files and/or data sets describing characteristics of the SUT. The modeling environment 14 may be adapted to manage the input and/or determine the model based on the input. The test model 18 may be represented in a general representation language, e.g. UML. The test model creator 12 may provide the test model 18 based on a domain specific profile 16, which may for example be provide as input and/or may represent an UML extension. In some variants, it may be considered that the creator 12 is configured or configurable with different profiles 16, which may be specific to different domains and/or different SUTs. A domain specific profile may pertain to one or more domains of the SUT, e.g. fields of technology it pertains to, and/or business field and/or user interface. The domain specific profile 16 may comprise and/or indicate terminology and/or language that is domain specific, e.g. a DSL (Domain Specific Language). A test model 18 may represent and/or comprise a plurality of paths, and/or series of interactions, between modeled parts of the SUT and/or corresponding interfaces. Interactions in a path and/or series may be contingent. Different paths or series may pertain to different reactions and/or behaviours of the SUT as represented by the model.

A scenario generator 20 of the system 10 may receive, as input, the test model 18, and provide, as output, test scenarios 22. In particular, the scenario generator 20 may comprise a model analyser 24, which may analyse and/or evaluate the test model 18, e.g. for completeness and/or integrity and/or coverage. The scenario generator 20 may comprise an item generator 26 adapted to provide individual test item from the test model 18. The test model 18 may be input in the item generator 26 and the analyser 24 independently. An analysis, or evaluation, and/or item generation may be based on and/or consider for example path coverage and/or data coverage. It may be considered that a test item pertains to one path of the test model 18.

The item generator 26 may provide output, e.g. test items, passed on to a scenario factory 28. The scenario factory 28 may be adapted to generate test scenarios 22, which may be abstract BDT scenarios 22, based on the test items. The factory 28 may be considered an abstraction layer for the test item, or as a translation layer for the test items to abstract BDT scenarios. The scenarios 22 may be provided individually, or grouped, or a combination thereof. The scenario generator 20 may operate based on a generator configuration, which may be provided as input to one or more of its components.

The scenarios 22 may be provided as input to a translator 30 of the system 10. The translator 30 may comprise a DSL formatting engine 34, which may receive the test scenarios 22. The engine 34 may translate the test scenarios 22 into BDT scenarios in a domain specific language, e.g. by formatting them accordingly, and/or arranging them according to DSL rules, which may be indicated by a DSL rule engine 36. A DSL rule checker 38 may check the output of the engine 34 for correctness. The translator 30, in particular the rule checker and/or formatting engine 34, may provide as output implementable BDT scenarios, which may be in a DSL, for example Gherkin or another language. The translator 30 may operate based on a translator configuration, which may be provided as input for the translator and/or one or more of its components. It may be considered that the translator 30 alternatively, or additionally, may operate based on the domain-specific profile 16, which in particular may be a DSL profile. The profile may be provided as input to one or more of the components of the translator 30.

It should be noted that exemplary arrangements of sub-components have been described. However, solutions in which functionalities of subcomponents are combined or arranged in different order may be considered. For example, the model analyser 24 and the item generator 26 may be combined, and/or the item generator 26 and the factory 28. Also, in some cases, the generator 20 and translator 30 may be combined. Each component, in particular the factory 18 and/or components downstream thereof, may comprise a plurality of subcomponents, which may be operable independently, e.g. for specific test items or scenarios, or groups thereof. For example, it may be considered that the formatting engine and/or translator comprises a plurality of subcomponents, which may be operable independently from each other, and/or may act on different test scenarios. In some variants, the formatting engine 34 and DSL rule engine 36, and/or the rule checker 38 and rule engine 36, and/or formatting engine 34 and rule checker 38 may be combined. Corresponding combinations of subcomponents may be considered.

The BDT scenarios 32 may be implemented, e.g. by running test on the SUT based on the BDT scenarios.

The approaches described herein are in particular useful for agile development, e.g. of software. A BDT scenario may generally pertain to a limited subset or aspect of the test model, in particular to a path or sub-path, e.g. a branch of a path. BDT may be considered as using test specification of the business readable and domain-specific language to describe the system's behaviour without dealing how that behaviour is implemented.

Testing, e.g. software testing, may generally be considered a process of executing a program or application with the intent of finding errors in the system or software under test. Testing can be also stated as the process of validating and verifying that a system, e.g. software program or application, meets the technical and business goals, fulfils the requirements and works as expected. As a result, the quality of the tested system or software can be improved and the risk of fatal errors can be significantly minimized.

Model-Based Testing (MBT) may be considered a test specification technique, which makes use of (test) models to generate the tests and other test-related artifacts like test code, test documentation, etc. A modeling environment may be aimed at an MBT approach. It may comprise one or more dedicated MBT tools. According to embodiments of the invention, advanced test techniques MBT and BDT may be combined. Domain-specific language may be used to close the gaps of these techniques and to build a new systematic method for testing in an agile context.

The embodiments facilitate more comprehensive tests by using the MBT approach to design a test model in a modeling environment one is not considering single pieces of the intended system behaviour, but the system (SUT) as a whole. Thus, one is able to achieve more comprehensive coverage during scenario specification and to decrease the likelihood of skipping scenarios important for the test. Non-functional tests may be considered (performance, availability, scalability, reliability, security, etc.). Combining the BDT and MBT approach allows modeling BDT scenarios for non-functional tests without changing anything in the agile development process. For that purpose, the test model may comprise one or more Message-Sequence Charts (MSC) and/or Communication Diagrams, respectively the modeling environment may be based on such.

Once the test model is created, the scenario generator of the BDT generator gets it as input. Using path coverage algorithms, for example all-paths, all-activities, all-transitions, etc., in combination with data coverage algorithms, e.g. pairwise, three-wise, n-wise, etc., a number of scenarios may be provided, allowing high levels of systematization and automatization. A reliable statement about the achieved coverage during testing may be provided, e.g. based on evaluating the test model and/or the test items and/or the test scenarios, e.g. by a model analyser.

The use of models may reduce effort for maintaining and reviewing the BDT scenarios. If a change occurs, this has to be made only once in the model. All affected scenarios will be then automatically generated and updated.

The combination of BDT and MBT closes not only the gaps of BDT, but also of MBT. In particular, it allows easy integration into agile development approaches. In agile development, a product owner is responsible to portion the work in items called Epics and User Stories. These are collected and managed in a so-called Product Backlog and are used as input for the test design. However, the information coming from the Epics and the User Stories is often insufficient for proper testing. MBT on the other hand is a technique used not only for test generation, but also to clarify the requirements, but its wide adoption in an agile development process is hindered because of the missing support for Epics and User Stories. To solve this issue and to take the best of both worlds, embodiments of this invention proposes usage of models to refine the Epics and the User Stories and to automatically generate scenarios in a BDT-compatible DSL language. Thus, the MBT approach can not only be integrated in an agile development process, but it rather completes it. This enables the integration of MBT in agile development without influencing other parts of the development process.

Collaboration between different stakeholders in a Project is facilitated, by involving them in the scenario definition project. Using semi-formal DSL language makes the scenarios easy to read, understand and review also by non-technical persons. Thus, relevant non-technical stakeholders can be involved in the test process by reviewing and discussing the intended use and intended behaviour of the system. This helps to avoid ambiguities and inconsistencies right from the beginning.

There is generally suggested to provide a test model and scenario modeling and generation using BDT-based notation, respectively a domain-specific profile or language. Providing a model using a standardized modeling language like UML for generation of behaviour-driven scenarios is considered, wherein the scenarios may be provided in DSL. This may be carried out by a BDT scenario generator, which takes as input a model created using a specific DSL-notation. This notation can be basically added to every modeling environment supporting UML. The modeling environment may provide all elements required for test modeling, which are usually defined in the UML standard, i.e. package element Use Case element, activity element, transition element, etc.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A modeling system, the modeling system comprising:
a processor,
wherein the processor is configured for providing a test model of a system under test, wherein the test model is based on an integrated modeling environment and considering a domain specific profile of the system under test, wherein the domain specific profile is selected from a plurality of profiles, wherein the test model includes a plurality of paths of the system under test as a whole, and wherein the test model is represented in Unified Model Language;
wherein the processor is configured for providing a plurality of test scenarios based on the test model, wherein the test scenarios are also represented in Unified Model Language, wherein the test scenarios are behavior-driven testing scenarios for a limited subset of the plurality of paths of the system under test;
wherein the processor is configured for translating the test scenarios from Unified Model Language into domain-specific language, wherein translating the test scenarios is based on the domain specific profile, wherein each translated test scenario of the translated test scenarios is a translated behavior-driven testing scenario for a respective path of the plurality of paths of the system under test.

2. The modeling system according to claim 1, wherein the processor is configured for performing tests of the system under test based on the translated test scenarios.

3. The modeling system according to claim 1, wherein the processor is configured for evaluating the test model.

4. The modelling system according to claim 1, wherein the processor is configured for updating the test model of the system under test; automatically providing a plurality of updated test scenarios in response to updating the test model; and automatically translating the updated test scenarios from Unified Model Language into domain-specific language, wherein automatically translating the updated test scenarios is based on the domain specific profile.

5. A method for providing test scenarios, the method comprising:
providing a test model of a system under test, wherein the test model is based on an integrated modeling environment and considering a domain specific profile of the system under test, wherein the domain specific profile is selected from a plurality of profiles, wherein the test model includes a plurality of paths of the system under test as a whole, and wherein the test model is represented in Unified Model Language;
providing a plurality of test scenarios based on the test model, wherein the test scenarios are also represented in Unified Model Language, wherein the test scenarios are behavior-driven testing scenarios for a limited subset of the plurality of paths of the system under test; and translating the test scenarios from Unified Model Language into domain-specific language, wherein translating the test scenarios is based on the domain specific profile, wherein each translated test scenario of the translated test scenarios is a translated behavior-driven testing scenario for a respective path of the plurality of paths of the system under test.

6. The method according to claim 5, the method further comprising performing tests of the system under test based on the translated test scenarios.

7. The method according to claim 5, the method further comprising evaluating the test model.

8. The method according to claim 5, further comprising:
updating the test model of the system under test;
automatically providing a plurality of updated test scenarios in response to updating the test model; and
automatically translating the updated test scenarios from Unified Model Language into domain-specific language, wherein automatically translating the updated test scenarios is based on the domain specific profile.

9. A computer program product, comprising:
A computer-readable non-transitory storage medium; and
a computer-readable program code stored in the computer-readable non-transitory storage medium, the computer-readable program code containing instructions that are executed by a processor of a computer system to implement a method for providing test scenarios, the method comprising:
providing a test model of a system under test, wherein the test model is based on an integrated modeling environment and considering a domain specific profile of the system under test, wherein the domain specific profile is selected from a plurality of profiles, wherein the test model includes a plurality of paths of the system under test as a whole, and wherein the test model is represented in Unified Model Language;
providing a plurality of test scenarios based on the test model, wherein the test scenarios are also represented in Unified Model Language, wherein the test scenarios are behavior-driven testing scenarios for a limited subset of the plurality of paths of the system under test; and
translating the test scenarios from Unified Model Language into domain-specific language, wherein translating the test scenarios is based on the domain specific profile, wherein each translated test scenario of the translated test scenarios is a translated behavior-driven testing scenario for a respective path of the plurality of paths of the system under test.

10. The computer program product according to claim 9, method further comprising performing tests of the system under test based on the translated test scenarios.

11. The computer program product according to claim 9, the method further comprising evaluating the test model.

12. The computer program product, according to claim 9, further comprising:
updating the test model of the system under test;
automatically providing a plurality of updated test scenarios in response to updating the test model; and
automatically translating the updated test scenarios from Unified Model Language into domain-specific language, wherein automatically translating the updated test scenarios is based on the domain specific profile.

* * * * *